US012424717B2

(12) United States Patent
Doumanis et al.

(10) Patent No.: US 12,424,717 B2
(45) Date of Patent: Sep. 23, 2025

(54) FREQUENCY ADJUSTABLE FILTER

(71) Applicant: Nokia Solutions and Networks Oy, Espoo (FI)

(72) Inventors: Efstratios Doumanis, Helsinki (FI); Jaakko Petteri Vuorio, Espoo (FI); Kari Johannes Hautio, Espoo (FI); Oskari Amper, Klaukkala (FI)

(73) Assignee: Nokia Solutions and Networks Oy, Espoo (FI)

( * ) Notice: Subject to any disclaimer, the term of this patent is extended or adjusted under 35 U.S.C. 154(b) by 110 days.

(21) Appl. No.: 18/116,029

(22) Filed: Mar. 1, 2023

(65) Prior Publication Data

US 2023/0291084 A1 Sep. 14, 2023

(30) Foreign Application Priority Data

Mar. 3, 2022 (GR) .............................. 20220100196

(51) Int. Cl.
*H01P 7/04* (2006.01)
*H01P 1/205* (2006.01)
(Continued)

(52) U.S. Cl.
CPC .............. *H01P 1/207* (2013.01); *H01P 1/205* (2013.01); *H01P 7/04* (2013.01); *H01P 7/06* (2013.01)

(58) Field of Classification Search
CPC .. H01P 1/202; H01P 1/20; H01P 1/201; H01P 1/205; H01P 1/2053; H01P 1/2133;
(Continued)

(56) References Cited

U.S. PATENT DOCUMENTS 7,969,260 B2 6/2011 Raty .............................. 333/203
9,287,599 B1 * 3/2016 White .................. H01P 1/2056
(Continued)

FOREIGN PATENT DOCUMENTS

CN 101246984 A 8/2008
CN 107851877 A 3/2018
(Continued)

OTHER PUBLICATIONS

Zhang, G. et al., "Compact Tunable Bandpass Filter With Wide Tuning Range of Centre Frequency and Bandwidth Using Short Coupled Lines," IEEE Access, vol. 6, Dec. 27, 2017, pp. 2962-2969.
(Continued)

*Primary Examiner* — Stephen E. Jones
(74) *Attorney, Agent, or Firm* — McCarter & English, LLP

(57) ABSTRACT

Arrangements for a frequency adjustable filter, which includes at least a housing, which includes one or more cavities closed by a lid above the housing are disclosed. In an arrangement, there is, per a cavity forming a resonator, a first resonator element extending from the lid, a second resonator element extending from the bottom, the second resonator element partially overlapping the first resonator element, an adjusting bar extending inside an area in which the first and the second resonator elements are overlapping, the adjusting bar being arranged to move within said area, a first hole either in the lid or in the bottom, a driving shaft, and an actuator arranged to move the adjusting bar through the first hole by means of the driving shaft. At least the first resonator element, the second resonator element and the adjusting bar are positioned to have a common vertical central axis.

10 Claims, 7 Drawing Sheets

(51) Int. Cl.
*H01P 1/207* (2006.01)
*H01P 7/06* (2006.01)

(58) Field of Classification Search
CPC .... H01P 1/207; H01P 7/04; H01P 7/00; H01P 7/06
See application file for complete search history.

(56) References Cited

U.S. PATENT DOCUMENTS

| | | | | |
|---|---|---|---|---|
| 10,957,960 | B2 | 3/2021 | Basavarajappa et al. | |
| 2010/0073111 | A1 | 3/2010 | Archer et al. | 333/232 |
| 2015/0288043 | A1 | 10/2015 | Buchauer et al. | 1/20 |
| 2018/0212298 | A1 | 7/2018 | Obermayer et al. | 7/4 |
| 2019/0140626 | A1 | 5/2019 | Juntunen et al. | 3/12 |

FOREIGN PATENT DOCUMENTS

| | | | |
|---|---|---|---|
| KR | 20150016069 | A | 2/2015 |
| WO | WO 2016/202687 | A1 | 12/2016 |
| WO | WO 2020/110091 | A2 | 6/2020 |

OTHER PUBLICATIONS

Kimsis, K. et al., "Mechanically tunable coupled resonator waveguide bandpass filter," 2019 IEEE Microwave Theory and Techniques in Wireless Communications, Nov. 14, 2019.
CN Office Action, CN Application No. 202310192606.9 dated Aug. 2, 2025, 13 pages.

* cited by examiner

FREQUENCY ADJUSTABLE FILTER

TECHNICAL FIELD

Various example embodiments relate to wireless communications, and especially to frequency adjustable filters.

BACKGROUND

Wireless communication systems are under constant development. In the long term, more spectrum will be needed to maintain quality of service and meet growing demand. Frequency adjustable filters facilitate to achieve efficient use of the spectrum in use.

SUMMARY

Independent claims define the scope of protection. The exemplary embodiments and features, if any, described in this specification that do not fall under the scope of the independent claims are to be interpreted as examples useful for understanding various implementation examples.

According to an aspect there is provided a frequency adjustable filter comprising at least a housing, which comprises one or more cavities closed by a lid above the housing, the frequency adjustable filter comprising, per a cavity forming a resonator, at least: a first resonator element extending from the lid towards a bottom of the cavity on an opposite side of the lid; a second resonator element extending from the bottom towards the lid, the second resonator element partially overlapping the first resonator element; an adjusting bar extending inside an area in which the first resonator element and the second resonator element are overlapping, the adjusting bar being arranged to move within said area; a first hole either in the lid or in the bottom; a driving shaft; and an actuator arranged to move the adjusting bar through the first hole by means of the driving shaft, wherein at least the first resonator element, the second resonator element and the adjusting bar are positioned to have a common vertical central axis.

In embodiments, the first resonator element is a first cylinder and the second resonator element is a second cylinder, one of the first and second cylinders extending inside the other one of the first and second cylinders.

In embodiments, the first cylinder and the second cylinder are metallic cylinders.

In embodiments, the frequency adjustable filter further comprises, per the cavity forming the resonator, when the first hole is in the lid, a support structure attached to the lid, arranged on the upper surface of the lid above the cavity, wherein the driving shaft is fixedly attached to the support structure; the actuator is a movable actuator arranged to move along the driving shaft; and the adjusting bar is attached to the actuator to move as the actuator move.

In embodiments, where the first hole is in the lid, the movable actuator comprises a second hole for the driving shaft; and the adjusting bar is attached to the bottom part of the movable actuator and comprises a hollow to accommodate the driving shaft, wherein the first hole, the second hole, and the movable actuator are positioned to have a common vertical central axis with the first resonator element, the second resonator element and the adjusting bar.

In embodiments, where the first hole is in the lid, the movable actuator comprises a second hole for the driving shaft; and the adjusting bar is attached to a vertical side of the movable actuator.

In embodiments, where the first hole is in the lid, the first resonator element has an upper end cover comprising a third hole through which the adjustable bar extends inside the area in which the first resonator element and the second resonator element are overlapping, the third hole having a common central axis with the first hole.

In embodiments, where the first hole is in the lid, the first hole in the lid is dimensioned to accommodate the actuator and the adjusting bar attached to the actuator; and the upper end cover comprises a fourth hole between the first hole in the lid and the third hole, the fourth hole being dimensioned to accommodate the actuator and the adjusting bar attached to the actuator.

In embodiments, where the first hole is in the lid, the frequency adjustable filter further comprises mechanical means for adjusting the position of the adjusting bar inside the area in which the first resonator element and the second resonator element are overlapping, the mechanical means being attached to the support structure.

In embodiments, where the first hole is in the bottom, the adjusting bar comprises a movable bar portion, a movable dielectric portion between the first resonator element and the second resonator element in the area in which the first resonator element and the second resonator element are overlapping, and a support portion between the movable bar portion and the movable dielectric portion, to move the movable dielectric portion according to the movement of the movable bar portion; the driving shaft is fixedly attached to the actuator; the first hole is dimensioned to accommodate the actuator; and the movable bar is arranged to move along the driving shaft.

In embodiments, where the first hole is in the bottom, an outer horizontal cross section of the movable bar portion is dimensioned to be substantially equal to an inner horizontal cross section of the second resonator element.

In embodiments, where the first hole is in the bottom, the movable dielectric portion is a movable dielectric element, the movable bar portion is a movable bar, and the support portion is a support structure attached to the movable dielectric element and the movable bar or the support portion is part of the movable dielectric element or part of the movable bar.

In embodiments, where the first hole is in the bottom, the support portion is made of plastic and/or the movable bar portion is made of plastic.

According to an aspect there is provided an apparatus comprising a plurality of frequency adjustable filters; at least one processor; and at least one memory including computer program code, the at least one memory and computer program code configured to, with the at least one processor, cause the apparatus at least to perform: filtering transmission over a radio interface using said plurality of frequency adjustable filters, wherein a frequency adjustable filter comprises at least a housing comprising one or more cavities closed by a lid above the housing, the frequency adjustable filter comprising, per a cavity forming a resonator, at least: a first resonator element extending from the lid towards a bottom of the cavity on an opposite side of the lid; a second resonator element extending from the bottom towards the lid, the second resonator element partially overlapping the first resonator element; an adjusting bar extending inside an area in which the first resonator element and the second resonator element are overlapping, the adjusting bar being arranged to move within said area; a first hole either in the lid or in the bottom; a driving shaft; and an actuator arranged to move the adjusting bar through the first hole by means of the driving shaft, wherein at least the first resonator element, the second resonator element and the adjusting bar are positioned to have a common vertical central axis.

In an embodiment of the apparatus, the movable actuator comprises a second hole for the driving shaft.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to “an”, “one”, or “some” embodiment(s) in several locations, this does not necessarily mean that each such reference is to the same embodiment(s), or that the feature only applies to a single embodiment. Single features of different embodiments may also be combined to provide other embodiments. Furthermore, words “comprising” and “including” should be understood as not limiting the described embodiments to consist of only those features that have been mentioned and such embodiments may contain also features/structures that have not been specifically mentioned. Further, although terms including ordinal numbers, such as “first”, “second”, etc., may be used for describing various elements, the structural elements are not restricted by the terms. The terms are used merely for the purpose of distinguishing an element from other elements. For example, a first signal could be termed a second signal, and similarly, a second signal could be also termed a first signal without departing from the scope of the present disclosure.

Figure 1:
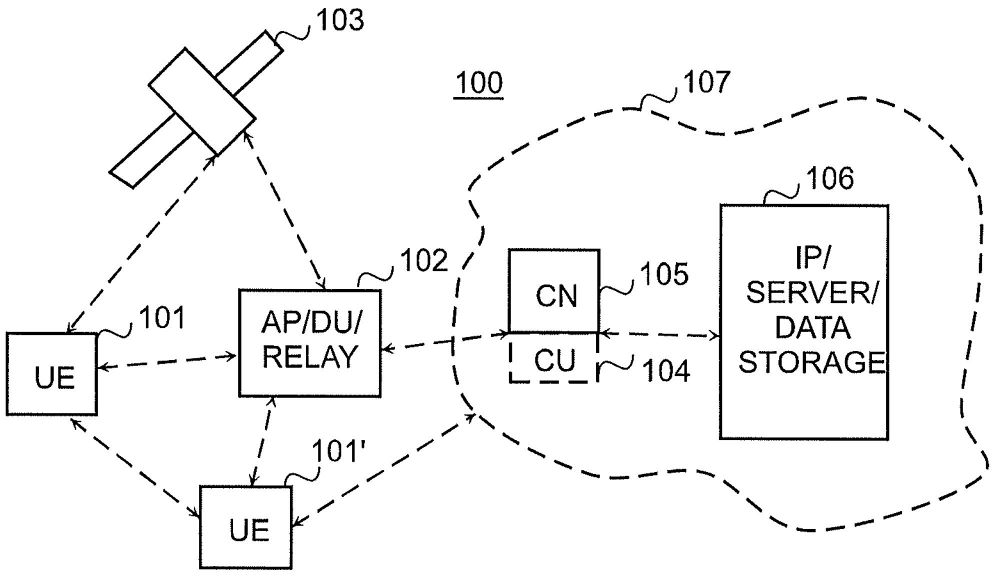
FIG. 1 illustrates an exemplified wireless communication system.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultrawideband (UWB) technology, sensor networks, mobile ad-hoc networks (MANETs) and Internet Protocol multimedia subsystems (IMS) or any combination thereof. FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system 100 given as an example but a person skilled in the art may apply the solution to other communication systems provided with necessary properties.

The example of FIG. 1 shows a part of an exemplifying radio access network.

FIG. 1 shows user devices 101, 101' configured to be in a wireless connection on one or more communication channels with a node 102. The node 102 is further connected to a core network 105. In one example, the node 102 may be an access node such as (e/g)NodeB providing or serving devices in a cell. In one example, the node 102 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), or access and mobility management function (AMF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The user device may also utilize cloud. In some applications, a user device may comprise a user portable device with radio parts (such as a watch, earphones, eyeglasses, other wearable accessories or wearables) and the computation is carried out in the cloud. The device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyberphysical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilize services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g) Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 7:
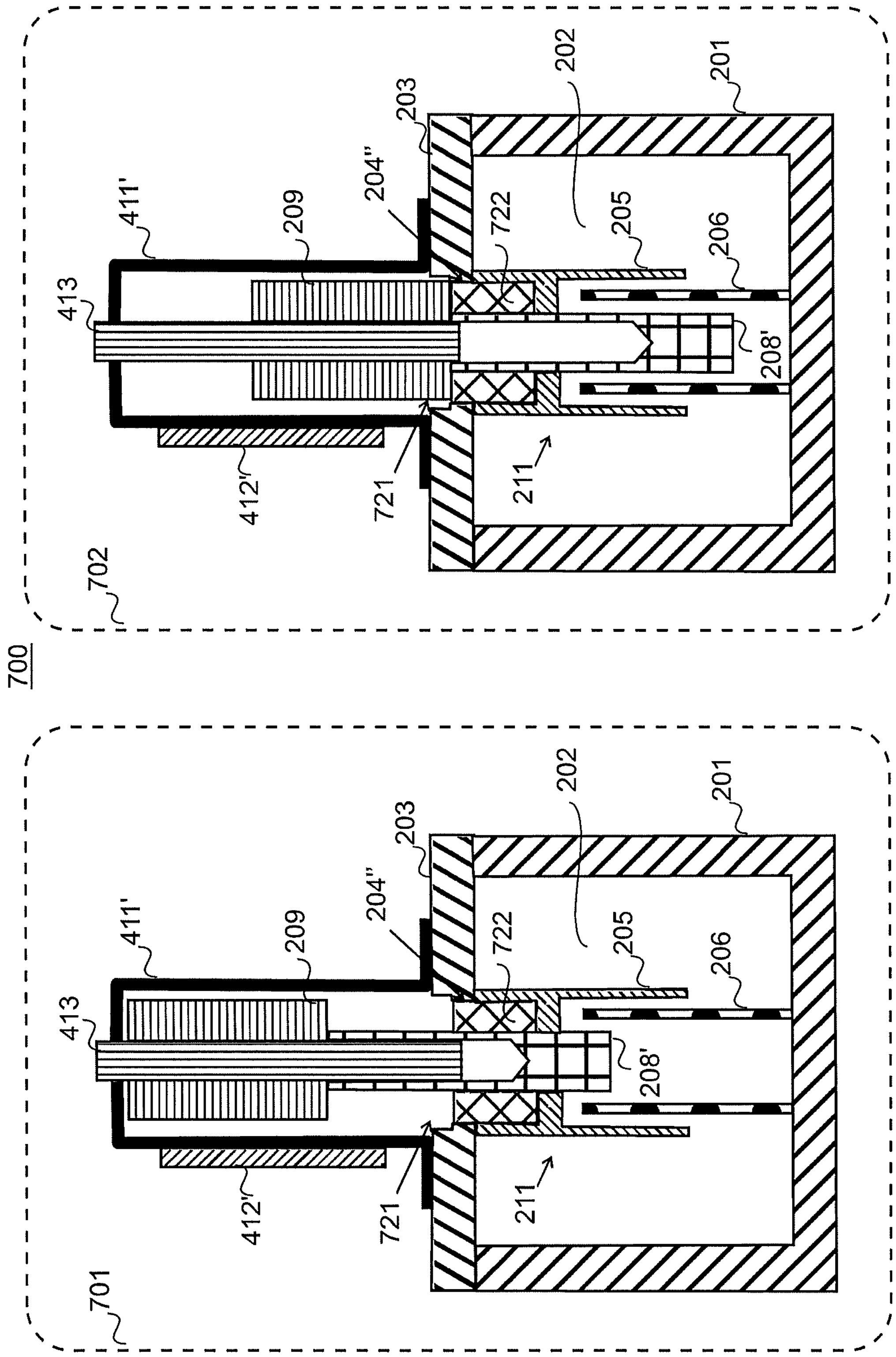
Figure 8:
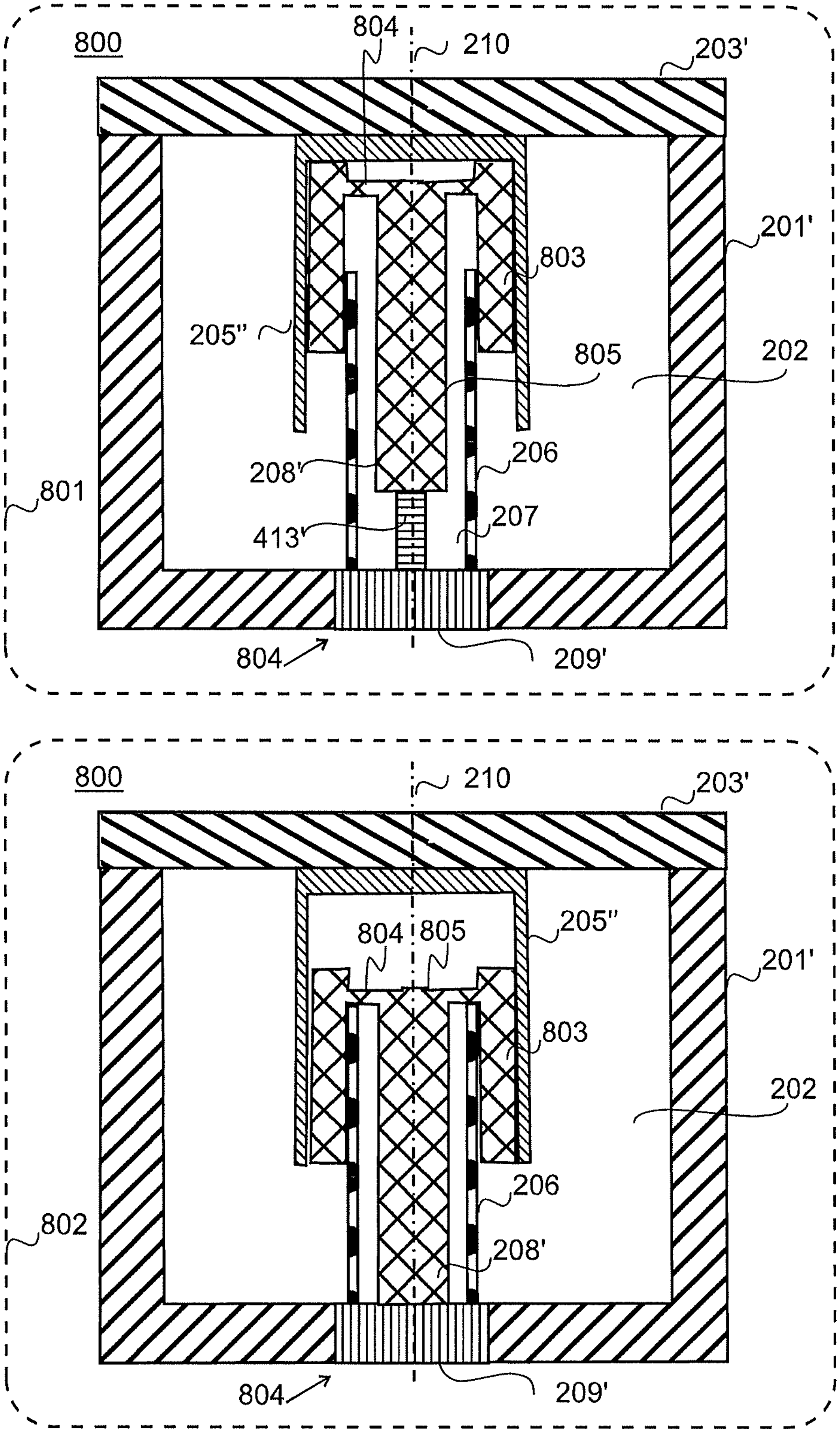

It is envisaged that in 5G, 6G and beyond, range of frequency bands will increase. To facilitate efficient use of the spectrum, frequency adjustable filters may be used in apparatuses. Below different examples of frequency adjustable filters, in which center frequencies of resonators are adjusted by adjusting bars penetrating within the resonators are disclosed. In other words, the fact that a resonant frequency of a resonator depends on a portion of an adjusting bar within the resonator, is utilized. Examples described below with FIGS. 2 to 6, 9 and 10 show only some portions of cavity arrangements for adjustable filters, whereas FIGS. 7 and 8 show example arrangements for an adjustable filter.

A frequency adjustable filter comprises at least a housing and a lid above the housing, the housing comprising one or more cavities closed by the lid. In the illustrated examples, a cavity forming a resonator comprises at least two resonator elements, and at least a hole either through the lid (examples of FIGS. 2 to 7) or through the bottom of the cavity (examples of FIGS. 8 to 10) for adjusting frequency, i.e. for tuning the resonator. Even though in the examples one pair of resonator elements with corresponding tuning mechanism (frequency adjusting mechanism) are disclosed, it should be appreciated that a cavity may comprise a plurality of pairs of resonator elements with a plurality of tuning mechanisms.

Figure 2:
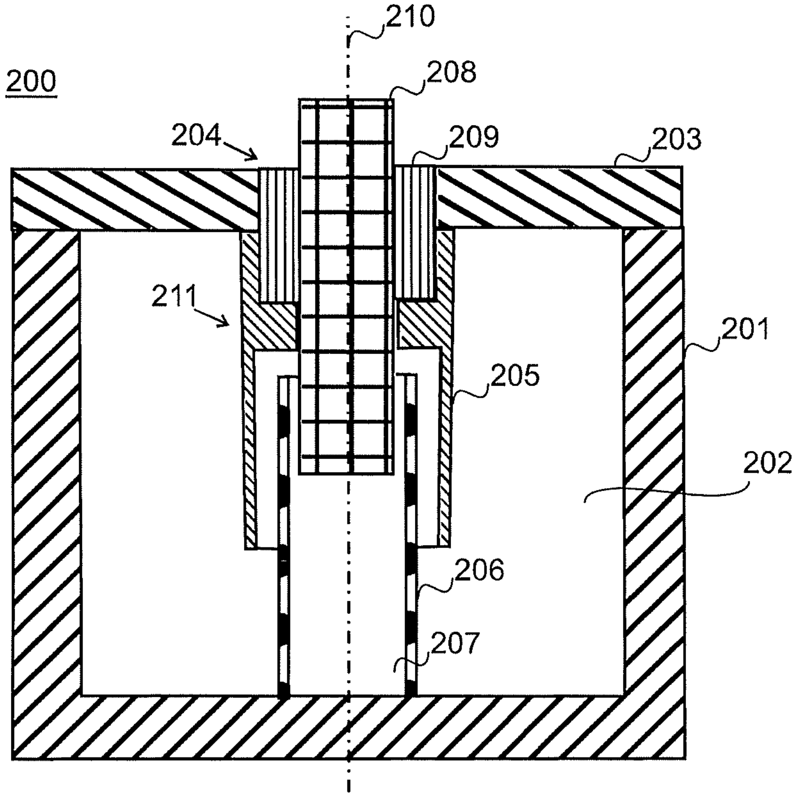
FIGS. 2 to 11 are schematic block diagrams showing different cross section views.

FIG. 2 is a schematic diagram showing a cross-section side view of an example implementation of a cavity arrangement in one cavity in a frequency adjustable filter.

Referring to FIG. 2, the cavity 202 in the frequency adjustable filter is within a housing (enclosure) 201 the frequency adjustable filter comprises and being closed by the lid 203. In the illustrated example of FIG. 2, a resonator, formed by the cavity 202, comprises, as resonator elements (resonator parts), at least one cylinder pair of overlaying cylinders 205, 206. The cavity arrangement further comprises a movable actuator 209 and a movable adjusting bar 208 attached to the movable actuator 209. Even though not illustrated in FIG. 2, the cavity arrangement further comprises an integrated mechanical support structure and one or more fixed driving shafts, examples being described below with FIGS. 4 to 6.

The movable adjusting bar 208 is a resonator tuner and it may be called a piston, or a pin or a rod. The actuator 209 may be called a motor. A non-limiting list of actuators includes a direct linear motor, a stepper motor and a piezo motor.

In the illustrated example of FIG. 2, the lid has a hole through which the movable adjusting bar 208 is extending to (penetrating) the resonator, i.e. to be within the resonator elements 205, 206 from the upper part of the cavity towards the bottom of the cavity within the resonator. In the illustrated example of FIG. 2, the hole 204 in the lid, called a first hole, is dimensioned to accommodate the actuator 209 and the adjusting bar 208 attached to the actuator 209.

In the illustrated example of FIG. 2, the resonator comprises a first cylinder 205, arranged to extend from the lid 203 towards a bottom of the cavity 202, and a second cylinder 206, arranged to extend from the bottom of the cavity 202 towards the lid 203, and the cylinders 205, 206 are dimensioned in the illustrated example so that the second cylinder 206 fits inside the first cylinder 205, and hence the cylinders are overlapping. Further, the cylinders are dimensioned so that the adjusting bar 208 fits inside a hollow 207, minimum horizontal dimension of the hollow 207 being defined by the inner surface, of the second cylinder 206. In other words, the adjusting bar 208 may move within the resonator, i.e within the first cylinder 205 and the second cylinder 206.

Further, in the illustrated example of FIG. 2, the first cylinder 205 has an upper end cover 211, which may be a static, non-tunable part of the resonator. The upper end cover 211 comprises a second hole through which the adjustable bar 208 extends to the first and second cylinders 205, 206, (hollows in the cylinders) and a third hole between the first hole 204 in the lid 203 and the second hole, the third hole being dimensioned to accommodate the actuator 209 and the adjusting bar 208 attached to the actuator. In the illustrated example the second hole and the third hole have the common central axis 210 with the first hole 204.

It should be appreciated that in another implementation it may that the first cylinder is dimensioned to fit inside the second cylinder, and the inner surface of the first cylinder defines the minimum horizontal dimension of the hollow. In other words, one of the first and second cylinders extends inside the other one of the first and second cylinders to provide resonator elements within which the movable adjusting bar may move. Naturally any other kind of resonator elements allowing the movable adjusting bar to extend to and move within the resonator may be used.

The different holes provide a guiding mechanism, or a guiding cavity, for the adjustable bar 208, providing a stable mechanical solution allowing accurate mechanical movement of the adjusting bar 208.

In the illustrated example of FIG. 2, the cavity 202, the hole 204 in the lid 203, the resonator elements 205, 206, the movable adjusting bar 208 and the actuator are arranged so that they have a common vertical axis 210. However, it should be appreciated that in another implementation, for example based on the one in FIG. 6, it is sufficient that the resonator and the adjusting bar are positioned to have the common vertical axis.

The housing 201 and/or the lid 203, and/or the adjustable bar 208 and/or the other resonator elements, for example the cylinders 205, 206, may be, or comprise, metallic material or be made of metal. When the housing 201 is made of metallic material, the inner metal surface of the cavity 202 is part of the resonator.

Figure 3:
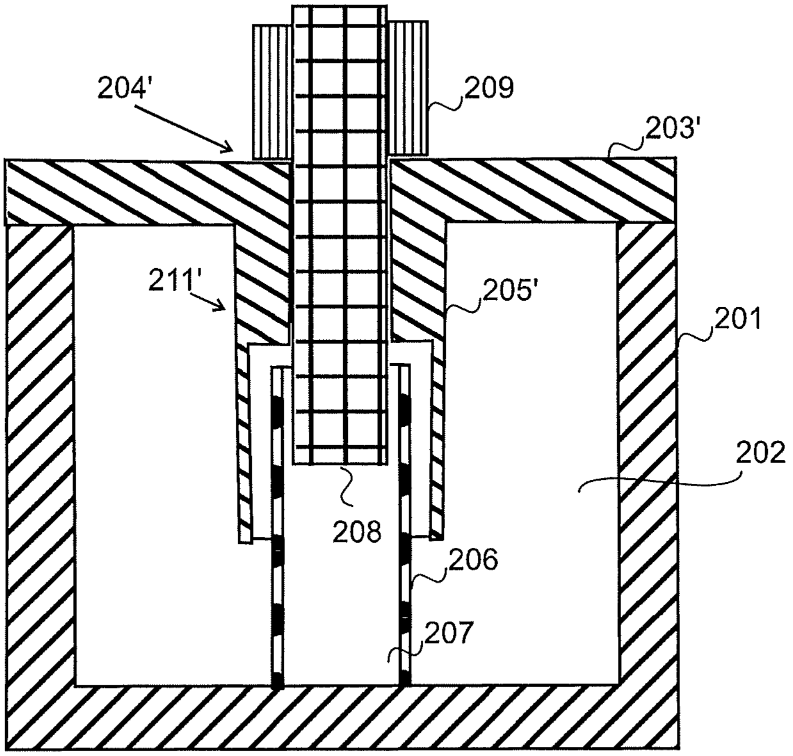

FIG. 3 is a schematic diagram showing a cross-section side view of another example implementation of a cavity arrangement in one cavity in a frequency adjustable filter.

FIG. 3 uses the same reference numbers as FIG. 2, and depicts the same portion of the cavity arrangement as FIG. 2. The cavity arrangement of FIG. 3 further comprises an integrated mechanical support structure and one or more fixed driving shafts, examples being described below with FIGS. 4 to 6.

Referring to FIG. 3, the cavity arrangement differs from the one illustrated in FIG. 2 in that respect that the upper end cover 211' of the first cylinder 205' has the second hole but no third hole, and the first hole 204' in the lid 203' is dimensioned to allow the adjusting bar 208 to extend to the cavity but not to accommodate the actuator 209 resulting that the actuator 209 will remain above the upper face of the lid 203. In the illustrated example the second hole has the common vertical axis (not illustrated in FIG. 3) with the first hole 204. Further, in the illustrated example the first cylinder 205' and the lid 203' have been made out of one piece of material, just to illustrate that such solutions can be implemented with any of the examples illustrated herein. It should be appreciated that the first cylinder 205' and the lid 203' may also be made of separate pieces of material.

Still a further possibility is that the first cylinder has no upper end cover, and the first hole is dimensioned as in FIG. 3, or the lid comprises two holes, dimensioned as the second and third hole in the example of FIG. 2 so that part of the lid will accommodate the actuator.

Figure 4:
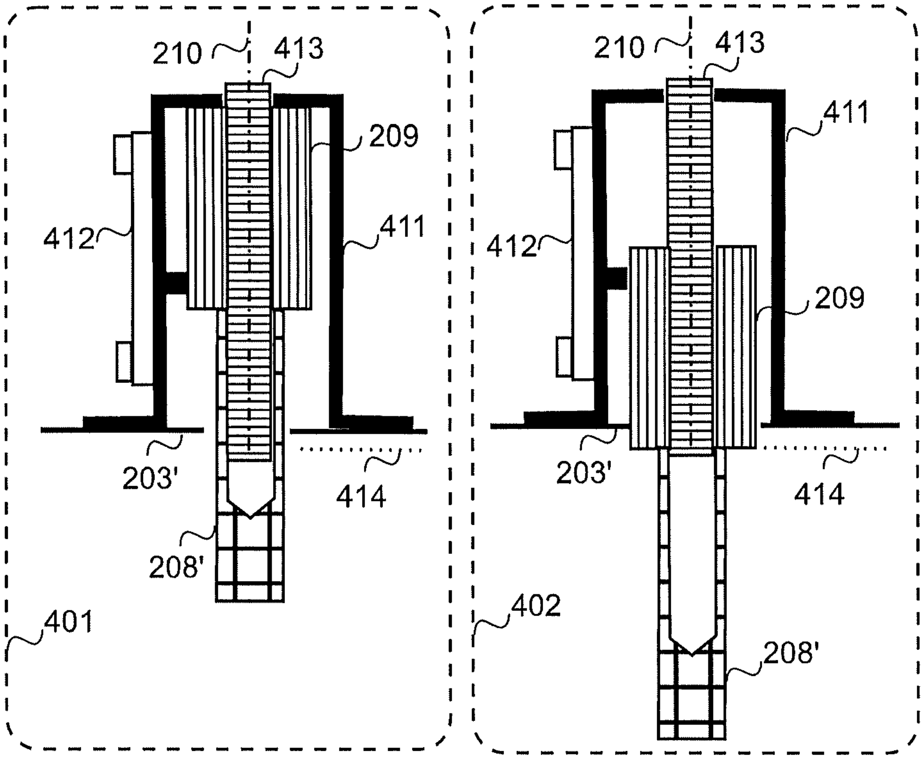

FIG. 4 is a schematic diagram showing a cross-section of an example of the integrated support structure, a fixed driving shaft, the actuator and the adjusting bar. FIG. 4 uses the same reference numbers as FIGS. 2 and 3.

In FIG. 4, the actuator 209 and the adjusting bar 208 are illustrated in extreme positions 401, 402, their position being adjustable between the extreme positions.

Referring to FIG. 4, the support structure (integrated support structure) 411 is a mechanical support structure 411 that is attached to the lid, arranged on the upper surface 203' of the lid above the cavity. The support structure may be a π-shaped metallic structure, or a cylinder-shaped structure, or a stool-like structure with 3 or 4 legs, made of sheet metal, for example. For example, a stool-like support structure may be formed by using two T-shaped metallic structures with a 90 degrees shift between them, the two structures sharing the same vertical axis. Naturally the support structure may be shaped differently. The support structure 411 may be mechanically attached to the lid at several positions.

In the illustrated example of FIG. 4, the support structure 411 comprises mechanical means (a mechanical adjustment mechanism) 412 attached to the support structure 411. The actuator position may be adjusted and maintained using the mechanical means. In other words, the mechanical means may be used to mechanically adjust the position of the adjusting bar in the resonator.

In the illustrated example of FIG. 4, the driving shaft 413, also called a drive shaft, is fixedly attached to the upper part of the mechanical support. In the illustrated example of FIG. 4, the driving shaft 413 is positioned so that its central axis is the common central axis 210 (common vertical axis). The driving shaft 413 is arranged to move the actuator 209 and the adjustable bar 208' between the upmost position 401 and the downmost position 402. More precisely, the movable actuator 209 is arranged to move along the driving shaft 413. Since the adjusting bar 208' is attached to the actuator 209, it is arranged to move correspondingly. In the illustrated example of FIG. 4, a level 414 where a bottom of the actuator 209 is at the downmost position 402 is below the upper surface of the lid.

In the example of FIG. 4, the adjustable bar 208' is a hollow bar, the hollow being dimensioned to allow the driving shaft 413 to enter the adjusting bar 208', i.e. the hollow in the adjusting bar, when the bar is moving towards the upmost position. The hollow in the bar provides a further addition to the guiding mechanism, or the guiding cavity. The solution is a very stable mechanical solution that allows an accurate mechanical movement of the adjusting bar. Further, the longer the guiding mechanism is, it is less likely to have increased friction due to adjustable bar tilting, and system performance under mechanical shocks and vibrations improves.

It should be appreciated that in other implementations, in addition to the mechanical means, or instead of the mechanical means, electronical circuitry controlling the movement of the actuator along the driving shaft may used for the same purpose.

Figure 5:
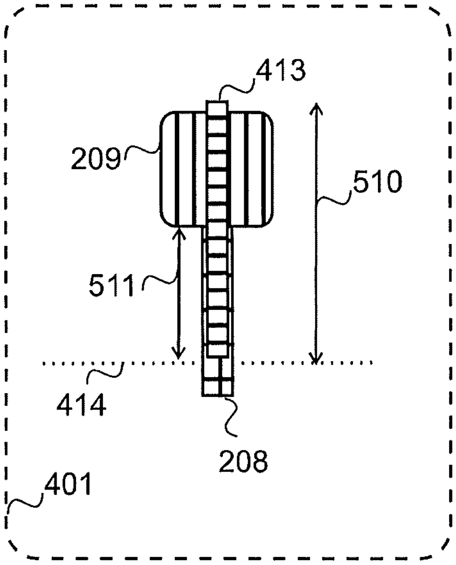
Figure 6:
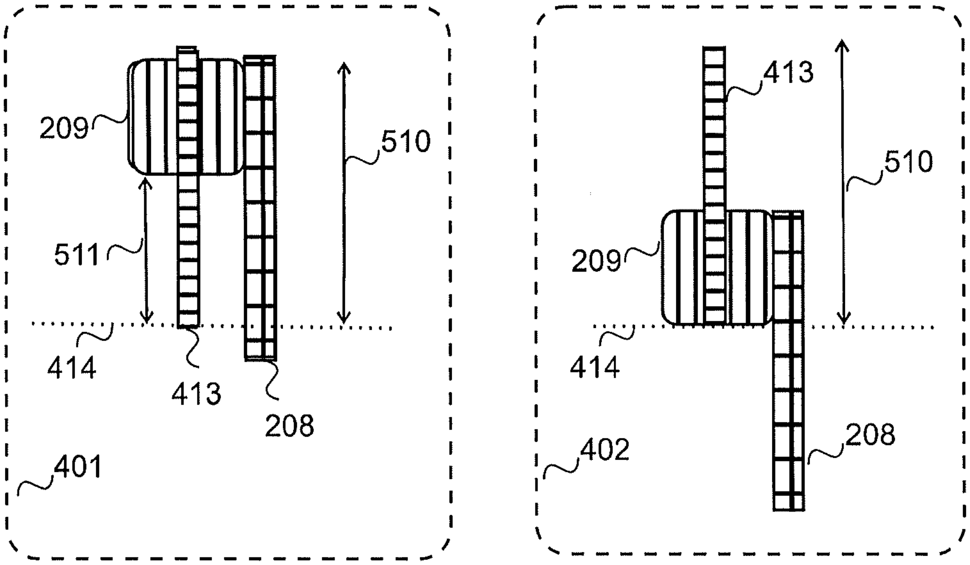

FIGS. 5 and 6 illustrates different examples how to attach (integrate) the adjusting bar 208 to the actuator 209. FIGS. 5 and 6 uses the same reference numbers as FIG. 4. In the example of FIG. 5, the adjusting bar 208 is attached to the bottom of the actuator 209, whereas in the example of FIG. 6, the adjusting bar 208 is attached to a side (a vertical side) of the actuator 209. Dimension 510 illustrates an overall height required for the driving shaft from the level 414 and dimension 511 illustrates the amount the adjustable pin and the actuator may move. By adjusting the height of the driving shaft 413, one may adjust the mechanical stroke that may be applied by the movement of the adjustable pin and the actuator.

Should the adjustable pin be attached to the driving shaft, the overall height would be a sum of dimensions 510 and 511. Hence, the disclosed solutions require less space and are more compact, thereby enabling to reduce overall vertical height of the filter.

FIG. 7 is a schematic diagram showing a cross-section of an example arrangement for an adjustable frequency filter 700, comprising a cavity arrangement, an integrated support structure, a fixed driving shaft, the actuator and the adjusting bar. FIG. 7 uses the same reference numbers as FIGS. 2, 3 and 4.

Referring to FIG. 7, the adjustable frequency filter 700 comprises a support structure 411' with mechanical means 412', the support structure being attached to the lid, arranged on the upper surface of the lid above the cavity, using the principles described above with FIG. 4. In FIG. 7, the actuator 209 and the adjusting bar 208' are illustrated in extreme positions 701, 702, their position being adjustable between the extreme positions, as described above with FIG. 4. Different examples for the shape of the support structure has been described above.

In the example of FIG. 7, the cavity 202 within the housing 201 comprises the cylinder pair of overlaying cylinders 205, 205, as described above with FIG. 2. However, in the examples of FIG. 7, above the upper end cover 211 there is a separate mechanical support part 722 for supporting movement of the adjusting bar 208' and for supporting the actuator 209. The mechanical support part 722 forms part of the guiding mechanism providing a stable mechanical solution allowing accurate movement of the adjusting bar 208'. It should be appreciated that the mechanical support part 722 may be part of the upper end cover of the cylinder, or part of the lid 203.

In the example of FIG. 7, the lid comprises above the first hole 204", which is configured to accommodate the actuator, and the mechanical support part 722 (or at least the one requiring more space), a fourth hole 721 for facilitating positioning of the support structure 411. Even though not separately illustrated in FIG. 7, the holes and the hollow in the adjusting bar have a common vertical axis.

However, it should be appreciated that any of the above described cavity arrangement to accommodate and guide the adjusting bar, or to accommodate and guide the actuator and the adjusting bar, could be used as well.

FIG. 8 is a schematic diagram showing a cross-section of an example cavity arrangement for an adjustable frequency filter 800. FIG. 8 uses the same reference numbers as FIGS. 2, 3 and 4.

Referring to FIG. 8, the adjustable frequency filter 800 comprises the housing 201' with a first hole 804, a lid 203' without any hole, enclosing a cavity 202 forming a resonator. The resonator further comprises the first resonator element 205", arranged to extend from the lid 203' towards a bottom of the cavity 202, and the second resonator element 206, arranged to extend from the bottom of the cavity 202 towards the lid 203', dimensioned so that the second resonator element 206 fits inside the first resonator element 205, and hence the resonator elements 205", 206 are overlapping. Different examples of the resonator element are disclosed above with FIGS. 2 and 3. The cavity arrangement further comprises an actuator 209' arranged to the first hole 804, which is dimensioned to accommodate the actuator 209', a driving shaft 413', and a movable adjusting bar 208'.

Unlike in the previous examples, in the example of FIG. 8 the actuator 209' is not arranged to move, but to move the driving shaft 413', fixedly attached to the actuator 209'. Different examples of the actuator 209' are described above with FIG. 2.

In the illustrated example of FIG. 8, the movable adjusting bar 208' is arranged to move along the driving shaft 413'. The movable adjusting bare 208' is positioned to have a common vertical central axis 210 with the first resonator part 205" and the second resonator part 206. In the illustrated example, the movable adjusting bar 208' has a non-tubular shape, comprising a first portion 803 (a movable dielectric portion), a second portion 804 (a support portion) and a tubular shape portion 805 (movable bar portion). The first portion 803 is dimensioned to accommodate a space between the first resonator element 205" and the second resonator element 206 in the area in which the first resonator element and the second resonator element are overlapping. The second portion 804 is between and the first portion 803 and the tubular shape portion 805, which is in the middle. The inner surface of the first portion 803 is dimensioned to be substantially equal with the outer surface of the second resonator part 206. Correspondingly, the outer surface of the first portion 803 is dimensioned to be substantially equal with the inner surface of the first resonator element 205". The substantially equal means that the dimensions of the first portion 803 allow the first portion to move between the resonator elements 205", 206 and yet allowing the resonator elements 205" 206, or more precisely the inner surface of the first resonator element 205" and the outer surface of the second resonator element 206, to accurately guide the vertical movement of the adjusting bar 20'8. In case an outer surface of the tubular shape portion 805 is dimensioned to be substantially equal with the inner surface of the second resonator part 206, also the tubular shape portion 805 and the second resonator part 206 provides accurate guidance to the vertical movement of the adjusting bar 208'.

Further, in the illustrated example the first portion 803 is vertically dimensioned so that even in the extreme positions 801, 802 part of the first portion 803 remains between the resonator elements 205", 206, and part of it is not between the resonator elements 205", 206 but within the first resonator element 205". In other words, the vertical dimension of the movable dielectric element 803 is longer than the vertical dimension of the overlap of the resonator elements 205", 206.

In the example, the adjusting bar 208' is made of dielectric material, for example a ceramic dielectric material. By introducing the dielectric material in the first portion 803 in the area of high capacitance, a resonant frequency of the resonator is significantly affected, and one may say that the movement of the first portion 803 performs the tuning. This allows to change a resonant frequency significantly with a minimum mechanical stroke. A further advantage is that there is no need to connect the tuning element and tuning mechanisms to ground, and hence no additional components to connect to the ground are needed.

In the example of FIG. 8, the first resonator part 205" and part of the second resonator part 206 form the guiding mechanism providing a stable mechanical solution allowing accurate movement of the adjusting bar 208'. As can be seen from FIG. 8, in the arrangement the total length of the first resonator part 205" can be used for guiding the mechanical movement and the arrangement has a reduced stroke. The reduced stroke with the length of the integrated guidance allows a robust and flexible design and minimizes mechanical drawbacks that arrangements with non-reduced stroke and non-integrated guidance have.

Figure 9:
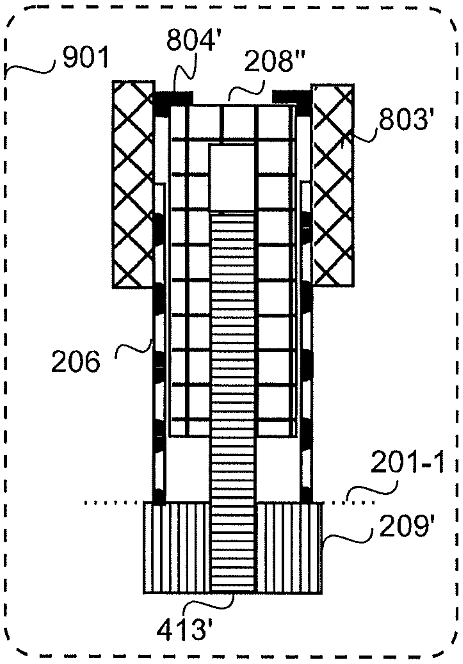
Figure 10:
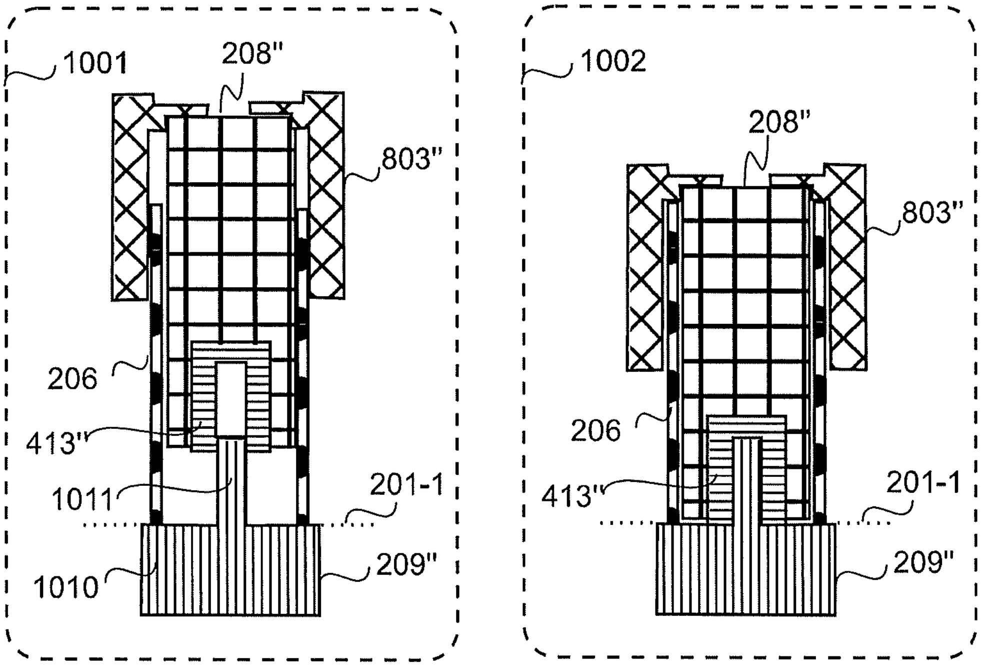

In FIG. 8, the adjusting bar 208' is illustrated in extreme positions 801, 802, the position being adjustable between the extreme positions by mechanical means using the actuator, as will be described below with FIGS. 9 and 10 disclosing a portion of the cavity arrangement. FIG. 9 illustrates an example in which the actuator is a direct linear motor, and FIG. 10 an example in which the actuator is a stepper motor. Further, FIGS. 9 and 10 illustrate alternative solutions how to provide the non-tubular shape adjusting bar, i.e. how to have the dielectric portion between the first and second resonator elements. It should be appreciated that any of the solutions may be used with any of the examples illustrated with FIGS. 8 to 10.

As can be seen from FIG. 8, integrating the tuning mechanism into the cavity and the housing reduces the overall vertical height, even compared to implementations illustrated by means of FIGS. 2 to 7. The same applies to examples of FIGS. 9 and 10.

In the example illustrated in FIG. 9, the non-tubular shape adjusting bar is formed by separate pieces of a movable dielectric element 803', a support structure 804' and a movable bar 208". In other words, the different portions of FIG. 8 of the adjusting bar are implemented using separate pieces.

The movable dielectric element 803' may be made of the ceramic dielectric material and dimensioned in a similar way as the first portion described above with FIG. 8.

The movable bar 208" may be a hollow bar, made of metal or plastic or dielectric material, or comprise metallic material and/or plastic and/or dielectric material. An example of plastic is polyamide. In the illustrated example, the movable bar 208" is dimensioned to be substantially equal with the minimum horizontal dimension of the hollow 207, which in the example of FIG. 9 is defined by the inner surface of the second cylinder 206. A plastic movable bar, compared to a metallic movable bar, weighs less and slides better with less friction against the inner surface of the resonator element 206, for example. The substantially equal means that the movable bar 208" has a dimension allowing the movable bar 208" to move within the second resonator element 206 and yet allowing the second resonator element 206, or more precisely its inner surface, to accurately guide the vertical movement of the movable bar 208", and hence the vertical movement of the movable dielectric element 803'. When the movable bar 208" is dimensioned so that the second resonator element 206 forms part of the guiding mechanism, the movable dielectric part 803' may be dimensioned to be thinner than described above with FIG. 8.

The support structure 804' is attached to the movable dielectric element 803' and to the adjusting bar 208" to connect them and thereby to move the movable dielectric element 803' according to the movement of the movable bar 208". The support structure 804' may be made of metal or plastic or dielectric material, or comprise metallic material and/or plastic and/or dielectric material. It should be appreciated that the support structure may have any other shape than the one illustrated.

For example, the non-tubular shape adjusting bar may comprise a movable ceramic dielectric element 803', a plastic support structure 804' and a metallic movable bar 208". If the movable bar 208" and the support structure 804' are made of same material, the support structure 804' may form part of the movable bar 208", i.e. they form together one piece.

In the example of FIG. 9, the direct linear motor 209' is attached to the housing (not illustrated in FIG. 9) at the bottom of the cavity, preferably such that its upper surface is on the same level as the upper surface 201-1 of the bottom of the cavity, and the second resonator element 206 is arranged on the upper surface of the direct linear motor 209'. The driving shaft 413' is fixedly attached to the direct linear motor 209', and a linear movement of the driving shaft 413' moves the movable bar 208", and thereby the movable dielectric element 803' between the upmost position 901 and the downmost position 902. As said above, the movable bar 208" is a hollow bar, the hollow being dimensioned to allow the driving shaft 413' to enter the movable bar 208", i.e. the hollow in the bar, when the bar is moving towards the downmost position. The hollow provides a further guiding to the guiding provided by the second resonator element 206, and the first resonator element if the movable dielectric element is dimensioned as described with FIG. 8.

Even though not separately illustrated in FIG. 9, the driving shaft and the hollow in the bar have a common vertical axis with the resonator elements.

Referring to FIG. 10, the non-tubular shape adjusting bar is formed by separate pieces of a movable dielectric element 803" having a support extension and a movable bar 208". The movable dielectric element 803" may be made of the ceramic dielectric material and a portion moving between the resonator elements may be dimensioned in a similar way as the first portion described above with FIG. 8. It should be appreciated that the support extension may have any other shape than the one illustrated. The movable bar 208" may be dimensioned as described above with FIG. 9, and it may be made of materials described above with FIG. 9.

In the example illustrated in FIG. 10, the stepper motor 209" has a motor part 1010 and a screw part 1011, the screw part 1011 extending upward from the upper surface of the motor part 1010. The stepper motor 209" is attached to the housing (not illustrated in FIG. 9) at the bottom of the cavity, preferably such that the upper surface of the motor part is on the same level as the upper surface 201-1 of the bottom of the cavity. The second resonator element 206 is arranged on the upper surface of the motor part of the stepper motor 209". A shaft 413" is rotatable fixedly attached to the stepper motor 209" to rotate around the screw part 1011. The screw part 1011, or the screw part 1011 and the shaft 413" form the driving shaft along which the movable bar 208" is arranged to move, thereby also moving the dielectric movable element 803". The screw part 1011 and the shaft 413" may be made of metal. The adjustable bar 208' is a hollow bar, the hollow being dimensioned to accommodate the shaft 413" so that the adjustable bar 208' will move as the shaft 413" moves. The stepper motor 209" creates the linear motion by rotating the shaft 413" along the screw part 1011 thereby moving the bar 208" and the movable dielectric element 803" between the upmost position 1001 and the downmost position 1002. The shaft 413" provides a side support to the screw part 1011, the side support stopping the screw part 1011 from rotating around itself and making the linear motion possible. Further, the inner surface of the second resonator element 206 and the outer surface of the bar 208" may be at least partly threaded to allow the rotating movement.

Use of the stepper motor allows to maintain a resolution of the vertical movement constant. In addition, the stepper motor may be arranged to make multiple steps per turn and do micro-stepping, which further increase the resolution. The resolution can further be increased by adding a gearbox to the arrangement. Further, it is possible to store the absolute position of the adjusting bar in steps, and hence, there is no need to have closed feedback loop positioning. The stepper motor also has some holding force even without current, thereby reducing power consumption and making the adjusting bar resilient to large movements caused by shocks and vibrations.

Even though not separately illustrated in FIG. 10, the screw part, the shaft and the adjusting bar have a common vertical axis with the resonator elements.

Even though in the above examples of FIGS. 8 to 10 it is assumed that the size of the actuator, and hence the outer horizontal dimension of the first hole accommodating the actuator is larger than the outer horizontal dimension of the second resonator, that may always not be the case. The outer horizontal dimension of the first hole may be equal to the outer horizontal dimension of the second resonator, still allowing the second resonator element being arranged on the upper surface of the actuator. A further possibility is that the outer horizontal dimension of the first hole is smaller than the inner horizontal dimension of the second resonator, in which case the second resonator element is arranged on the upper surface of the bottom of the cavity.

In the above examples, the movable adjusting bar's penetration stroke is comparable to the height of the resonator, and thereby the disclosed examples provide a compact mechanism to tune a frequency adjustable filter. In the example of FIGS. 8, to 10 the tuning occurs by the first portion, or by the dielectric movable element taking advantage of the high capacitance area, and hence for the same tuning range the mechanical stroke is smaller than a mechanical stroke needed by the metallic adjusting bar in the examples of FIGS. 2 to 7. Correspondingly, with the same mechanical stroke, the tuning range obtainable by the examples of FIGS. 8 to 10 is bigger than in the examples of FIGS. 2 to 7.

Figure 11:
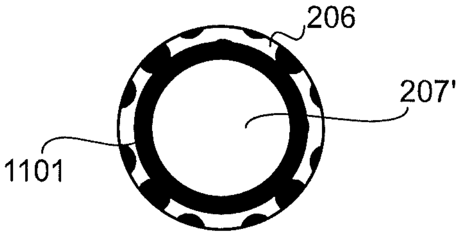

Although in the above examples, there is one driving shaft for one actuator, it should be appreciated that there may be for one actuator two or more driving shafts that are fixedly attached to the support structure, or to the actuator. FIG. 11 illustrates a further possibility to increase a tuning range of any of the above described examples. Referring to FIG. 11, a hollow of the smaller of the first and second resonator elements, in the example the hollow 207' of the second resonator element 206 extending from the bottom is partially filled with a dielectric material 1101, for example with polytetrafluoroethylene.

As can be seen from the above examples, different adjusting/tuning mechanisms to resonators in frequency adjustable filters are disclosed, the adjusting mechanisms using a movable adjusting bar arranged to move within overlapping resonator elements. The movable adjusting bar being moved by the actuator through the first hole by means of the driving shaft. In other words, a fixed driving shaft moves the actuator at least within the first hole, and thereby the movable actuator, or the actuator is arranged to the first hole, and a driving shaft fixed to the actuator moves the movable adjusting bar.

Figure 12:
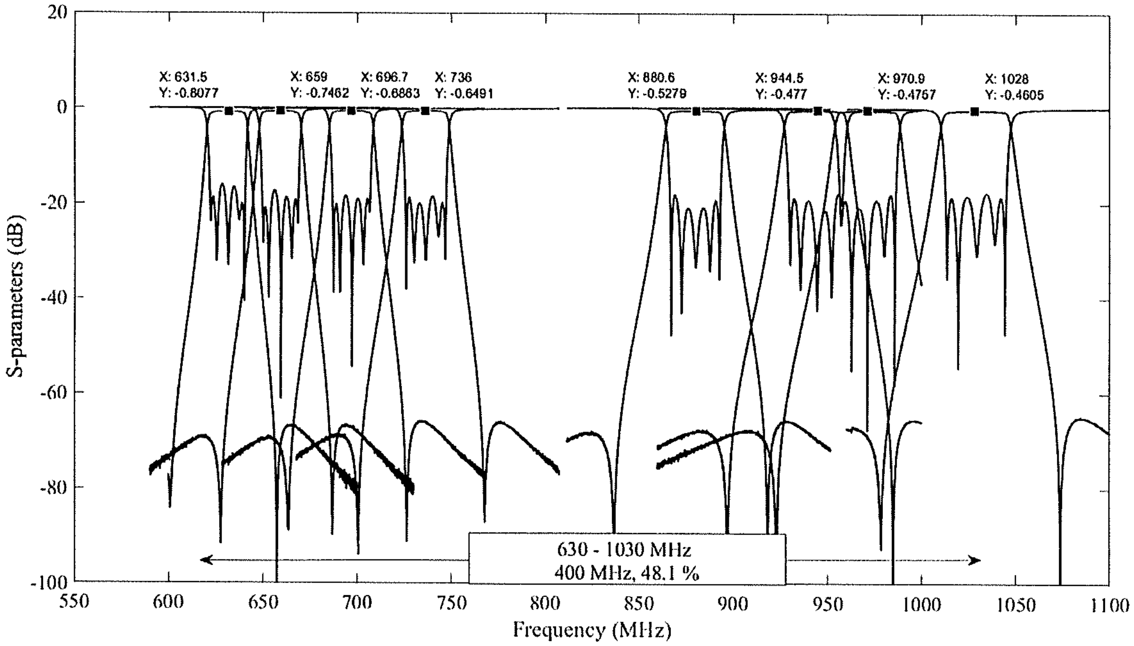
FIG. 12 shows simulation results.

The above disclosed examples provide a frequency adjustable filter with a wide tuning range, as are shown by simulation results in FIG. 12 obtained from an adjustable filter having five resonators according to the example of FIG. 7. More precisely, in the simulations, five adjusting bars (one per resonator) that are movable separately to new positions between the two extreme positions are used. The different frequencies in FIG. 12 correspond to the different positions of the adjusting bars for all the five resonators.

As can be seen from FIG. 12, electrical performance of the filter is not deteriorated along its tuning range, and the tuning range is a 48% wide tuning range. S-parameters are illustrated for transmission and reflection.

Figure 13:
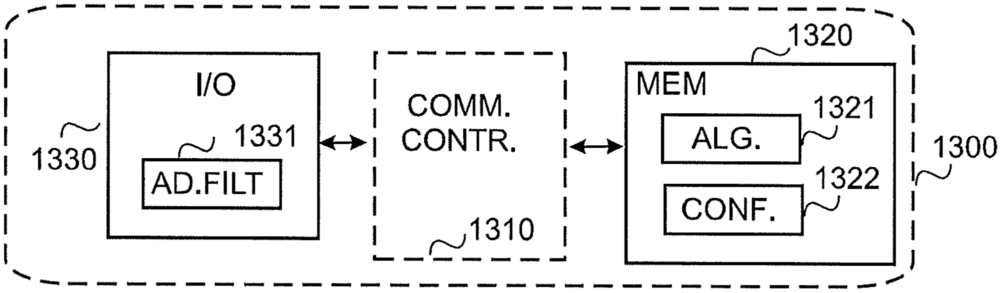
FIG. 13 is a schematic block diagram.

FIG. 13 illustrates an apparatus comprising a communication controller 1310 such as at least one processor or processing circuitry, and at least one memory 1320 including a computer program code (software, algorithm) ALG. 1321, wherein the at least one memory and the computer program code (software, algorithm) are configured, with the at least one processor, to cause the apparatus to carry out at least filtering of transmissions using one or more frequency adjustable filters 1331 according to any one of the embodiments, examples and implementations described above. The apparatus 1300 may be, for example a base station or an access node, a user equipment, or terminal device in a vehicle, or any electronic device, examples being listed above with FIG. 1.

Referring to FIG. 13, the memory 1320 may be implemented using any suitable data storage technology, such as semiconductor based memory devices, flash memory, magnetic memory devices and systems, optical memory devices and systems, fixed memory and removable memory. The memory may comprise a configuration storage CONF. 1321, such as a configuration database The memory 1320 may further store other data, such as a data buffer for data waiting to be processed (including transmission).

Referring to FIG. 13, the apparatus comprises a communication interface 1330 comprising hardware and/or software for realizing communication connectivity according to one or more wireless and/or wired communication protocols. The communication interface 1330 may provide the apparatus with radio communication capabilities, as well as communication capabilities towards core network. The communication interface 1330 comprises one or more frequency adaptable filters 1331, according to any one of the embodiments, examples and implementations described above The communication interface 1330 may further comprise standard well-known components such as an amplifier, filter, frequencyconverter, (de) modulator, and encoder/decoder circuitries and, in case wireless communication is supported, one or more antennas.

Digital signal processing regarding transmission and reception of signals may be performed in a communication controller 1310. The communication controller may comprise an electrical circuitry for controlling and/or adapting the one or more frequency adaptable filters 1331.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory (ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. A frequency adjustable filter comprising at least a housing, which comprises one or more cavities closed with a lid above the housing, the frequency adjustable filter comprising, per a cavity forming a resonator, at least:

a first resonator element extending from the lid towards a bottom of the cavity on an opposite side of the lid;

a second resonator element extending from the bottom towards the lid, the second resonator element partially overlapping the first resonator element;

an adjusting bar extending inside an area in which the first resonator element and the second resonator element are overlapping, the adjusting bar being arranged to move within said area;

a first hole in the lid;

a driving shaft; and an actuator arranged to move the adjusting bar through the first hole with the driving shaft, wherein at least the first resonator element, the second resonator element and the adjusting bar are positioned to have a common vertical central axis;

further comprising per the cavity forming the resonator, a support structure attached to the lid, arranged on the upper surface of the lid above the cavity, wherein the driving shaft is fixedly attached to the support structure;

the actuator is a movable actuator arranged to move along the driving shaft; and the adjusting bar is attached to the actuator to move as the actuator move.

2. The frequency adjustable filter of claim 1, wherein the first resonator element is a first cylinder and the second resonator element is a second cylinder, one of the first and second cylinders extending inside the other one of the first and second cylinders.

3. The frequency adjustable filter of claim 2, wherein the first cylinder and the second cylinder are metallic cylinders.

4. The frequency adjustable filter of claim 1, wherein the movable actuator comprises a second hole for the driving shaft; and the adjusting bar is attached to the bottom part of the movable actuator and comprises a hollow to accommodate the driving shaft, wherein the first hole, the second hole, and the movable actuator are positioned to have a common vertical central axis with the first resonator element, the second resonator element and the adjusting bar.

5. The frequency adjustable filter of claim 1, wherein the movable actuator comprises a second hole for the driving shaft; and the adjusting bar is attached to a vertical side of the movable actuator.

6. The frequency adjustable filter of claim 1, wherein the first resonator element has an upper end cover comprising a third hole through which the adjustable bar extends inside the area in which the first resonator element and the second resonator element are overlapping, the third hole having a common central axis with the first hole.

7. The frequency adjustable filter of claim 6, wherein the first hole in the lid is dimensioned to accommodate the actuator and the adjusting bar attached to the actuator; and the upper end cover comprises a fourth hole between the first hole in the lid and the third hole, the fourth hole being dimensioned to accommodate the actuator and the adjusting bar attached to the actuator.

8. The frequency adjustable filter of claim 1, further comprising a mechanical adjustment mechanism for adjusting the position of the adjusting bar inside the area in which the first resonator element and the second resonator element are overlapping, the mechanical adjustment mechanism being attached to the support structure.

9. An apparatus, comprising:

a plurality of frequency adjustable filters;

at least one processor; and at least one non-transitory memory storing instructions that, when executed with the at least one processor, cause the apparatus at least to perform:

filtering a transmission over a radio interface using said plurality of frequency adjustable filters, wherein a frequency adjustable filter comprises at least a housing comprising one or more cavities closed with a lid above the housing, the frequency adjustable filter comprising, per a cavity forming a resonator, at least:

a first resonator element extending from the lid towards a bottom of the cavity on an opposite side of the lid;

a second resonator element extending from the bottom towards the lid, the second resonator element partially overlapping the first resonator element;

an adjusting bar extending inside an area in which the first resonator element and the second resonator element are overlapping, the adjusting bar being arranged to move within said area;

a first hole either in the lid;

a driving shaft; and an actuator arranged to move the adjusting bar through the first hole with the driving shaft, wherein at least the first resonator element, the second resonator element and the adjusting bar are positioned to have a common vertical central axis;

further comprising per the cavity forming the resonator, a support structure attached to the lid, arranged on the upper surface of the lid above the cavity, wherein the driving shaft is fixedly attached to the support structure;

the actuator is a movable actuator arranged to move along the driving shaft; and the adjusting bar is attached to the actuator to move as the actuator move.

10. The apparatus of claim 9, wherein the movable actuator comprises a second hole for the driving shaft.

* * * * *